June 20, 1933.  S. A. DALAGER  1,915,015
POWER TAKE-OFF
Filed Dec. 31, 1931  2 Sheets-Sheet 1
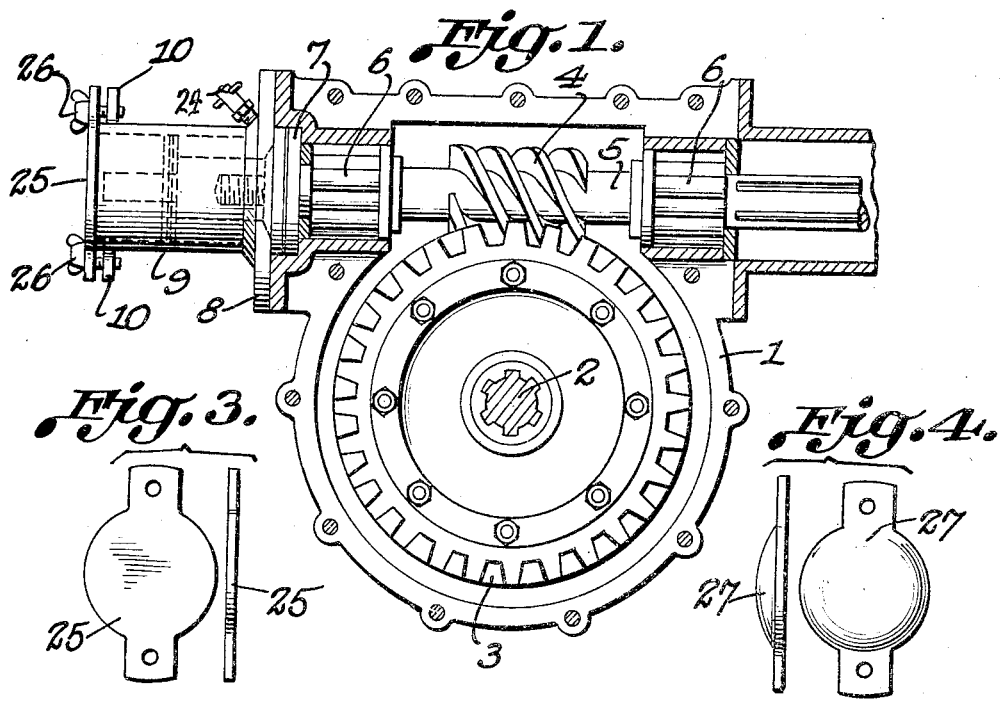
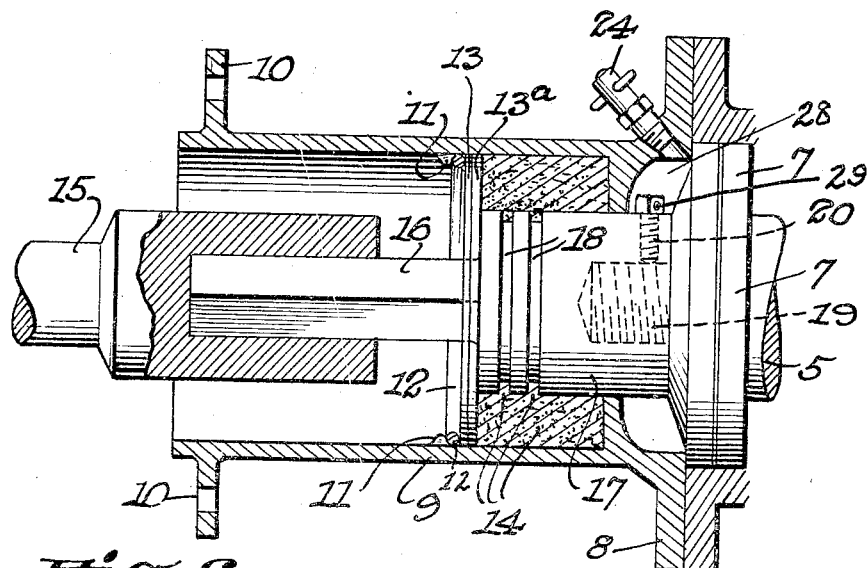
Inventor:
Sophus A. Dalager
by Lester L. Sargent
Atty.

June 20, 1933. S. A. DALAGER 1,915,015
POWER TAKE-OFF
Filed Dec. 31, 1931 2 Sheets-Sheet 2

Inventor:
Sophus A. Dalager
by Lester L. Sargent
Atty.

Patented June 20, 1933

1,915,015

UNITED STATES PATENT OFFICE

SOPHUS A. DALAGER, OF GLENWOOD, MINNESOTA

POWER TAKE-OFF

Application filed December 31, 1931. Serial No. 584,263.

The object of my invention is to provide an improved power take-off especially adapted for use in connection with Ford trucks or any other motor vehicle having a worm drive for use in operating various other machinery.

I attain these and other objects of my invention by the mechanism illustrated in the accompanying drawings, in which,—

Figure 1 is a side elevation of the power take-off showing its relation to the drive shaft of the truck or other vehicle to which it is applied;

Fig. 2 is a longitudinal section through the power take-off;

Fig. 3 is a detail view of member 25 in plan and in edge elevation;

Fig. 4 is a detail view of member 27 in plan and in edge elevation;

Figure 6:
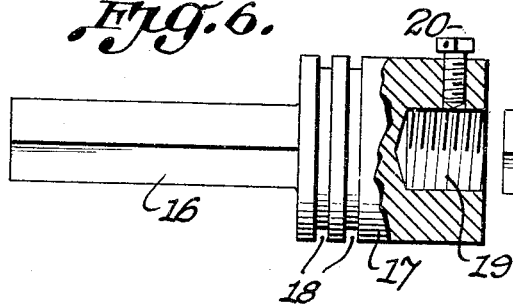
Figure 7:
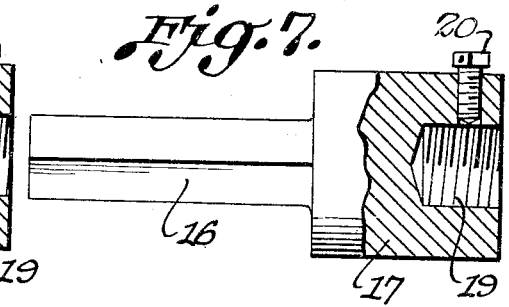

Fig. 6 is a side elevation of members 16 and 17, a portion of member 17 being shown in section;

Fig. 7 is a similar view of a modification with the grooves 18 omitted.

Figure 8:
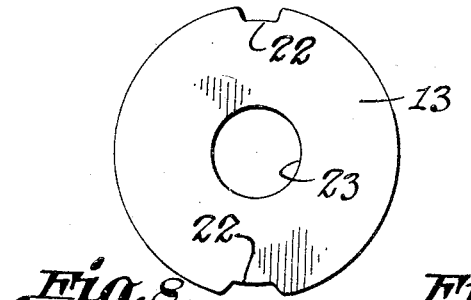
Figure 9:
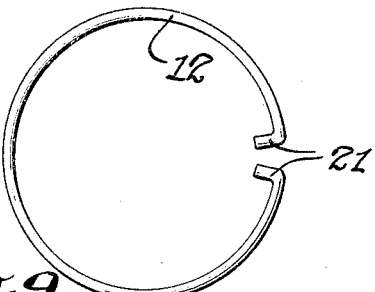

Fig. 8 is a detail plan view of a cap or washer member;

Fig. 9 is a detail view of a ring for securing plate or washer 13 in place; and

Figure 10:
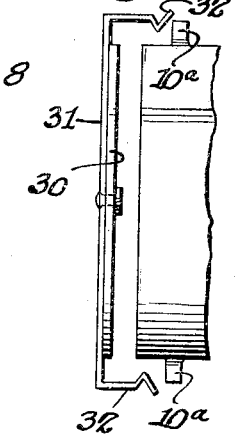

Fig. 10 shows an improved snap-on cap 30 with a spring member 31 whereby to provide a snap-on cap for the shank housing.

Like numerals designate like parts in each of the several views.

Referring to Fig. 1 of the drawings, there is illustrated an outer casing 1 for worm wheel 3 on axle 2. Worm wheel 3 meshes with a worm 4 on drive shaft 5 which is mounted in suitable roller bearings 6 and provided with a thrust collar 7, these members being conventional parts of the automobile or truck. I provide a power take-off casing 9 having an integral housing 8 for mounting on the correspondingly shaped portion of the drive shaft housing. I also provide apertured lugs on the outer end of casing 9.

Figure 5:
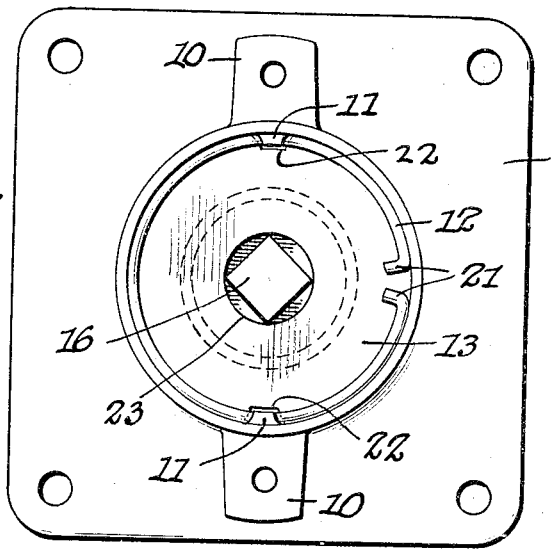
Fig. 5 is an end elevation of the power take-off.

Referring to Figs. 2 and 5, I provide studs 11 to engage the removable ring 12 which in turn holds the disc 13 in place against the leather washer 13a and packing 14 for hub 17. Hub member 17 is provided with a squared end 16 which engages the drive shaft 15, the latter shaft operating the particular machinery by means of this power take-off. I provide annular grooves 18 in hub member 17. The packing dips into grooves 18, thus preventing any grease or oil from going out past the shank. As shown in Fig. 2 the power drive shaft 5 is provided with a threaded end 19 which has a threaded engagement with the power take-off. I provide suitable square head set screws 20 in the power take-off to engage member 19, and which can be locked by passing a wire through head. The packing 14 does not come in contact with set screw 20.

Referring to Figs. 5 and 9, the removable ring 12 is provided with slightly spaced inturned ends 21. As shown in Fig. 8 the disc 13 is provided with opposite recesses 22 and with a central opening 23. This opening 23 is just large enough to slip over the squared part of the shank. As shown in Figs. 1 and 2 the power take-off is provided with a suitable alemite fitting 24, screw-threaded in casing 9.

As shown in Fig. 3, I provide a plate 25 for the end of the power take-off, this plate being fastened by suitable thumb screws 26, as shown in Fig. 1, to apertured lugs 10.

Member 27 illustrated in Fig. 4 is a concave plate adapted to be attached to the power take-off in place of the plate 25 to afford more space.

In using the invention the regular cap at the rear end of the worm is removed and my housing 8 is bolted in its place. The large nut on the rear end of the worm shaft is removed and my hub member or shank 17 is secured in its place, in operative engagement with the drive shaft 5. The squared end 16 of the hub or shank 17 engages the end of the driven shaft 15 which is suitably connected with whatever machinery the power take-off is to operate. Any suitable universal joint (not shown) may be connected on the squared end 16 if necessary for operating a particular machine.

As shown in Fig. 2, a suitable packing is placed around the hub or shank 17 to keep grease from working out past the shank. The metal disc 13, as shown in Fig. 8, holds a leather washer 13a of the same size as disc 13 and goes between disc and hub member 17 and thus holds packing 14 in place and the wire spring 12 which removably engages studs 11 and disc 13 holds the metal disc 13 in place. The hole 23 in disc 13 is just large enough to slip over the squared part 16 of the shank. The concave cap 27 is used when a longer shank is secured to the drive shaft, but when a short shank is used then the flat cap 25 may be attached. Suitable thumb or wing screws hold the cap 27 (or cap 25 as the case may be) in place on power take-off housing 9. The cap 27 (or 25) is removed when doing belt work with the truck and a suitable universal joint is inserted and connected on squared end 16 of the shank. A short shaft (with a suitable belt pulley) squared on one end can be supported on the under side of the rear end of the truck box or platform supporting beams and slidably disconnected or connected with my power take-off. I provide a chamber 28 at the end of casing 9, as shown in Fig. 2, into which a wire may be inserted to engage the aperture 29 in the head of the square-headed screw 20 to lock same by running a wire around shank.

One truck rear wheel or both, are raised from the ground when my power take-off is connected by a belt with some other machinery which it is desired to operate.

The new power take-off is available for many purposes. It may be utilized for operating concrete and other mixers, circular wood saws, for hoisting or elevating service, for running portable feed mills, potato graders, fence post drivers, labor saving machinery for use in woods and wood lots and for sawing wood miles away from home, the wood being thrown into the truck at the same time, to pump water, spread straw, drive line shafts, run large grain cleaners, also grain elevators on farms, to run tree sprayers, to run air pressure paint spraying machines, single or triple sheep shearing machines, to operate fence post barking machinery, to run broadcasting grain seeding machines, etc.

I have devised an improved form of cap 30 as shown in Fig. 10 having a flat spring 31 with angularly bent ends 32 positioned to engage shortened lugs 10a as shown in Fig. 10. In the form of the invention no thumb screws are required and no threaded holes in the members 10. The cap may be very quickly put on and taken off.

I claim:

1. In a power take-off, the combination of a housing adapted to be fastened to the drive shaft housing of a motor vehicle said housing having a cylindrical casing integral therewith and open at the end, a hub within said casing and adapted to be securely affixed to the drive shaft of the motor vehicle, said hub having a squared end adapted to be operatively connected with any desired machinery to be operated from the drive shaft of the motor vehicle, a disc seated against the end of the hub and having a central aperture of sufficient diameter to pass over the squared end of the hub, means for releasably securing the disc in the cylindrical casing, and packing within the casing encircling the hub.

2. In combination with the device defined in claim 1, the aforesaid hub having annular grooves to prevent grease or oil from coming out past the hub.

3. In a power take-off, the combination of a housing adapted to be fastened to the drive shaft housing of a motor vehicle said housing having a cylindrical casing integral therewith, a hub within said casing and adapted to be securely affixed to the drive shaft of the motor vehicle, said hub having a squared end adapted to be operatively connected with any desired machinery to be operated from the drive shaft of the motor vehicle, a disc seated against the end of the hub and having a central aperture of sufficient diameter to pass over the squared end of the hub, studs on the inside of the cylindrical casing, a split ring adapted to be removably seated adjacent said studs and in contact with the disc to releasably hold same in place, packing within the portion of the casing encircling the hub, and washers retaining the packing in place at one end, and an annular inwardly projecting flange on the casing retaining the packing in place at the other end.

4. In a power take-off, the combination of a housing adapted to be fastened to the drive shaft housing of a motor vehicle, said housing having a cylindrical casing of uniform diameter integral therewith, a cylindrical hub within said housing and adapted to be securely affixed to the drive shaft of the motor vehicle, said hub having a squared end within the aforesaid cylindrical casing adapted to be operatively connected with any desired machinery to be operated from the drive shaft of the motor vehicle, a concave cap adapted to cover the open end of the removable casing and detachably secured to the casing.

5. In a power take-off, the combination of a housing adapted to be fastened to the drive shaft housing of a motor vehicle, said housing having a cylindrical casing integral therewith, the casing having a chamber formed at one end thereof, a hub adapted to be affixed to the drive shaft of the motor vehicle, a set screw disposed within the aforesaid chamber having an aperture in its head for securing the said hub to the drive shaft of the vehicle, an alemite fitting screw-threaded in the casing, the aforesaid hub having a squared end adapted to be operatively connected with any desired machinery to be actuated from the drive shaft of the motor vehicle.

SOPHUS A. DALAGER.